United States Patent
Farag et al.

(10) Patent No.: US 8,450,026 B2
(45) Date of Patent: May 28, 2013

(54) SOLID ELECTROLYTE FUEL CELL COMPRISING AN ELECTROCATALYST/ELECTROLYTE ASSEMBLY SUPPORTED BY A NANO-STRUCTURED MATERIAL

(75) Inventors: Mina Farag, Cupertino, CA (US); Chris Bajorek, Los Gatos, CA (US)

(73) Assignee: Intematix Corporation, Fremont, CA (US)

( * ) Notice: Subject to any disclaimer, the term of this patent is extended or adjusted under 35 U.S.C. 154(b) by 454 days.

(21) Appl. No.: 12/127,372

(22) Filed: May 27, 2008

(65) Prior Publication Data

US 2009/0148740 A1 Jun. 11, 2009

Related U.S. Application Data

(60) Provisional application No. 60/931,621, filed on May 24, 2007.

(51) Int. Cl.
*H01M 8/00* (2006.01)
*H01M 8/10* (2006.01)

(52) U.S. Cl.
USPC ........... 429/485; 429/487; 429/491; 429/523; 429/535

(58) Field of Classification Search
USPC .................. 429/515, 465, 483, 115, 9, 218.1, 429/494, 400, 434, 535, 485, 523, 491, 487; 216/7; 502/182, 185; 204/157.42; 427/115
See application file for complete search history.

(56) References Cited

U.S. PATENT DOCUMENTS

| | | | |
|---|---|---|---|
| 2002/0048699 A1* | 4/2002 | Steele et al. | 429/30 |
| 2002/0179564 A1* | 12/2002 | Geobegan et al. | 216/7 |
| 2003/0104258 A1 | 6/2003 | Haile et al. | |
| 2006/0008696 A1* | 1/2006 | Cha et al. | 429/38 |
| 2006/0014068 A1* | 1/2006 | Boysen et al. | 429/33 |
| 2006/0020070 A1 | 1/2006 | Chisholm et al. | |
| 2006/0115711 A1* | 6/2006 | Kim et al. | 429/44 |

OTHER PUBLICATIONS

"Synthesis of platinum/multi-wall carbon nanotube catalysts", Mu et al., State Key Lay of Advanced Technology for Materials Synthesis and Processing, Wuhan University of Technology, China, Apr. 2, 2004.*

(Continued)

*Primary Examiner* — Basia Ridley
*Assistant Examiner* — Kenneth Douyette
(74) *Attorney, Agent, or Firm* — Quine Intellectual Property Law Group, P.C.

(57) ABSTRACT

A membrane electrode assembly for a solid electrolyte fuel cell comprises: an electrode having a layer of nano-structured material on one of its faces, an electrocatalyst deposited on the nano-structured material and an electrolyte deposited on the electrocatalyst/nano-structured material. The nano-structured material can comprise carbon, silicon, graphite, boron, titanium and be in the form of multi-walled nano-tubes (MWNTs), single-walled nano-tubes (SWNTs), nano-fibers, nano-rods or a combination thereof. The nano-structured material can be grown or deposited on one face of an electrode of the cell or on a substrate such as a flexible sheet material of carbon fibers using chemical vapor deposition. The electrocatalyst and electrolyte can be incorporated in the nano structured material using physical vapor deposition (PVD), ion beam sputtering or molecular beam epitaxy (MBE).

23 Claims, 3 Drawing Sheets

OTHER PUBLICATIONS

"DuPont Fuel Cells, DuPont Nafion PFSA Membranes", Nafion product description, DuPont Corporation, 2009. Retrieved online on Dec. 21, 2010 from: http://www2.dupont.com/FuelCells/en_US/assets/downloads/dfc101.pdf.*

"BASF Fuel Cell, Inc.", Technical Product Sheet, BASF Chemical Company, Retrieved online on Dec. 21, 2010 from: http://www.jonnycoder.net/aces/faq/index.php.*

"Characterization of YSZ Solid Oxide Fuel Cells Electrolyte Deposited by Atmospheric Plasma Spraying and Low Pressure Plasma Spraying", Zhang et al., Journal of Thermal Spray Technology, vol. 15, No. 4, Dec. 2006.*

Haile, et al., "Solid acids as fuel cell electrolytes", Nature, vol. 410, p. 910-913, Apr. 19, 2001.*

Haile, Sossina M, "Solid Acid Based Fuel Cell", California Institute of Technology, Contract No. N00014-02-1-0192, pp. 1-2, Jan. 28, 2005.*

* cited by examiner

SOLID ELECTROLYTE FUEL CELL COMPRISING AN ELECTROCATALYST/ELECTROLYTE ASSEMBLY SUPPORTED BY A NANO-STRUCTURED MATERIAL

This application claims priority to and benefit of a prior U.S. Provisional Application No. 60/931,621, Solid Electrolyte Fuel cell, by Mina Farag, et al., filed May 24, 2007. The full disclosure of the prior application is incorporated herein by reference.

BACKGROUND OF THE INVENTION

1. Field of the Invention

This invention relates to solid electrolyte fuel cells and more particularly to fuel cells having a solid acid electrolyte. Moreover, although not exclusively, the invention concerns an electrocatalyst support and electrode assembly for a solid electrolyte fuel cell.

2. Description of the Related Art

Currently there is much interest in fuel cells as a possible alternative clean energy source. As is known, a fuel cell combines hydrogen and oxygen to form water and produce a direct electrical current. A fuel cell comprises two electrodes, an anode and cathode, which are separated by an electrolyte. The electrolyte conducts ions (protons $H^+$) between the cell electrodes but is impervious to electrons which flow between the electrodes around an external conduction path containing the load to complete the electrical circuit and to thereby provide electrical current flow to the load. In operation the fuel, molecular hydrogen, is oxidized by a catalyst at the anode ($H_2 \rightarrow 2H^+ + 2e^-$) and molecular oxygen is reduced at the cathode to produce water ($\frac{1}{2}O_2 + 2H^+ + 2e^- \rightarrow H_2O$). These two half reactions are completed by the flow of ions ($H^+$ protons) through the electrolyte and by the flow of electrons ($e^-$) through the external circuit. Other fuels, such as methanol $CH_3OH_4$ or ethanol $C_2H_5OH$, can also be used to power the cell but have to be reformed to molecular hydrogen before providing them to the fuel cell.

There are a number of types of fuel cell and these are broadly categorized by the electrolyte membrane used in their construction. Common fuel cells include polymer electrolyte membrane fuel cells (PEMFCs), alkaline fuel cells (AFCs), phosphoric acid fuel cells (PAFCs), molten carbonate fuel cells (MCFCs) and solid oxide fuel cells (SOFCs). More recently solid acid fuel cells (SAFCs) have been proposed in which the electrolyte comprises a superprotonic solid acid, such as $CsH_2PO_4$ (cesium dihydrogen phosphate CDP) which is a material which is partway between an acid and a salt. An example of a solid acid fuel cell membrane electrode assembly (MEA) 1 is shown in FIG. 1. As is known the MEA comprises a stack of members including: an anode electrode 2; a gas diffusion layer 3; an electrocatalyst layer 4, a solid acid electrolyte layer 5, a further electrocatalyst layer 6, a further gas diffusion layer 7 and a cathode electrode 8.

In the example illustrated the anode 2 and cathode 8 are made of stainless steel and have a hole 9 passing through their entire thickness to enable the introduction of fuel (hydrogen $H_2$) and an oxidant (e.g. air, oxygen $O_2$) into the fuel cell through the anode 2 and cathode 8 respectively and to allow fuel cell by-products (e.g. water $H_2O$ in the form of steam, $CO_2$) to escape from the cell.

The gas diffusion layers 3, 7 typically comprise a porous ceramic material. The electrocatalyst 4, 6 which typically comprises a noble metal such as platinum or an alloy thereof is coated onto powdered carbon (carbon black) which functions as an electrocatalyst support. The solid acid electrolyte layer 5 comprises a solid salt. The cell 1 is constructed by physical stacking of the layers of the MEA, applying pressure to the assembly to ensure good contact between the electrocatalyst and electrolyte and enclosing the MEA within a gas tight enclosure (not shown).

US2006/0014068 and US2003/0104258 teach processes, techniques and compositions used to fabricate SAFC membrane electrode assemblies and US2006/0020070 discloses a SAFC electrolyte.

Potentially, SAFCs offer a number of advantages including a simplified construction since the electrolyte is in solid form and the ability to operate at intermediate temperatures in a range 150 to 350° C. The inventors have appreciated that in such cells the achievable power density is limited by the surface area of interfacing between the electrocatalyst and solid electrolyte. Moreover, due to the elevated operating temperature and by-products carbon corrosion of the carbon (carbon black) or graphite electrocatalyst support can reduce the life expectancy of the cell.

SUMMARY OF THE INVENTION

The object of the invention is to increase the catalyst/electrolyte interface area, to reduce carbon monoxide poisoning of the cell and to simplify the fabrication of a solid acid fuel cell. These objects are achieved, at least in part, by the use of a nano-structured electrocatalyst support onto which the electrolyte is additionally deposited. In one arrangement the support comprises a carbon nano-structure such as carbon nano-tubes. In other arrangements it comprises nano fibers, filaments or rods of materials including carbon, silicon, boron and titanium. An advantage of the present invention is that the nano-structured support additionally provides the function of the gas diffusion layer eliminating the need for a discrete gas diffusion layer thereby further simplifying the construction of the MEA. Moreover, the use of a nano-structured material, in particular one which has been grown and is consequently crystalline in structure, results in a more stable electrocatalyst support which is less prone to corrosion. Additionally, a nano-structured support maximizes the surface area of the electrocatalyst for a given volume thereby reducing cost as less electrocatalyst is required.

According to the invention a membrane electrode assembly for a solid electrolyte fuel cell comprises: an electrode having a layer of nano-structured material on one of its faces, an electrocatalyst deposited on the nano-structured material and an electrolyte deposited on the electrocatalyst/nano-structured material.

The nano-structured material can comprise: carbon, silicon, boron or titanium and be in the form of multi-walled nano-tubes (MWNTs), single-walled nano-tubes (SWNTs), nano-fibers, nano-rods or a combination thereof.

In one arrangement the nano-structured material is grown in situ on the electrode surface such that it is crystalline in nature. Alternatively the nano-structured material can be deposited on the electrode surface in the form of nano-particles. In a further arrangement the nano-structured material can be grown or deposited on a substrate such as carbon, boron, silicon or titanium which for ease of fabrication is in the form of a thin flexible sheet such as for example carbon fiber paper or Toray™ paper. In such an arrangement the substrate is porous, that is gas permeable, and in conjunction with the nano-structured materials acts as a gas diffusion layer. The nano-structured material can be grown using chemical vapor deposition.

The electrocatalyst, which can comprise a noble metal, an alloy of a noble metal, or d-block element, can be deposited on the nano-structured material using physical vapor deposition (PVD), ion beam sputtering, molecular beam epitaxy (MBE), evaporation, laser ablation or like techniques. The electrocatalyst should cover as large a surface area of the nano-structured catalyst support as possible to maximize catalytic activity thereby requiring the electrocatalyst to be deposited on a nano scale.

In one arrangement the electrode comprises an electrically conducting porous material or composite such as porous stainless steel. Alternatively or in addition the electrode can have one or more passages passing through its thickness to allow the passage of gases through the electrode.

The electrolyte can be deposited on the nano-structured material/electrocatalyst using physical vapor deposition (PVD), ion beam sputtering, molecular beam epitaxy (MBE), evaporation, laser ablation, magnetron sputtering, dipping, spraying or like.

According to a second aspect of the invention an electrocatalyst support for a solid acid fuel cell comprises a substrate having a layer of nano-structured material grown on one of its faces and an electrocatalyst incorporated within the nano-structured material.

As with the membrane electrode assembly of the invention the nano-structured material can comprise carbon, silicon, boron or titanium in the form of multi-walled nano-tubes (MWNTs), single-walled nano-tubes (SWNTs), nano-fibers, nano-rods or a combinations thereof. The nano-structured material can be grown in situ on a substrate using for example chemical vapor deposition or deposited on a substrate. For ease of fabrication the substrate is in the form of a thin flexible sheet such as for example carbon fiber paper or Toray™ paper. In such an arrangement the substrate is porous, that is gas permeable, and in conjunction with the nano-structured materials acts as a gas diffusion layer.

The electrocatalyst, which can comprise a noble metal, an alloy of a noble metal, or d-block element, can be deposited on the nano-structured material using physical vapor deposition (PVD), ion beam sputtering, molecular beam epitaxy (MBE), evaporation, laser ablation, magnetron sputtering, spraying, dipping or like techniques. The electrocatalyst should cover as large a surface area of the nano-structured catalyst support as possible to maximize catalytic activity thereby requiring the electrocatalyst to be deposited on a nano scale.

According a further aspect of the invention there is provided a solid electrolyte fuel cell incorporating a membrane electrode assembly or electrocatalyst support in accordance with the invention.

BRIEF DESCRIPTION OF THE DRAWINGS

In order that the present invention is better understood embodiments of the invention will now be described, by way of example only, with reference to the accompanying drawings in which.

DETAILED DESCRIPTION OF THE INVENTION

Figure 1:
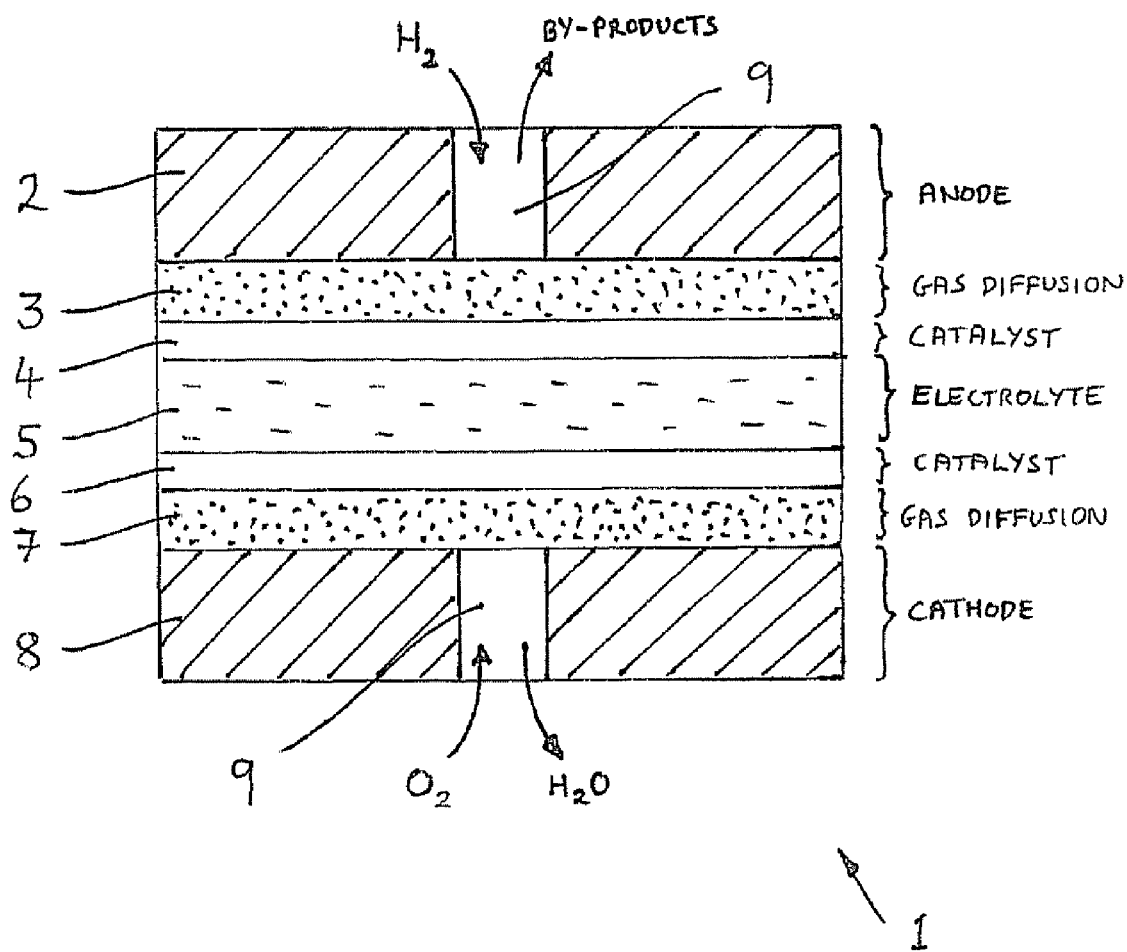
FIG. 1 is a schematic representation of a prior art solid acid fuel cell membrane electrode assembly (MEA) as hereinbefore described.
Figure 2:
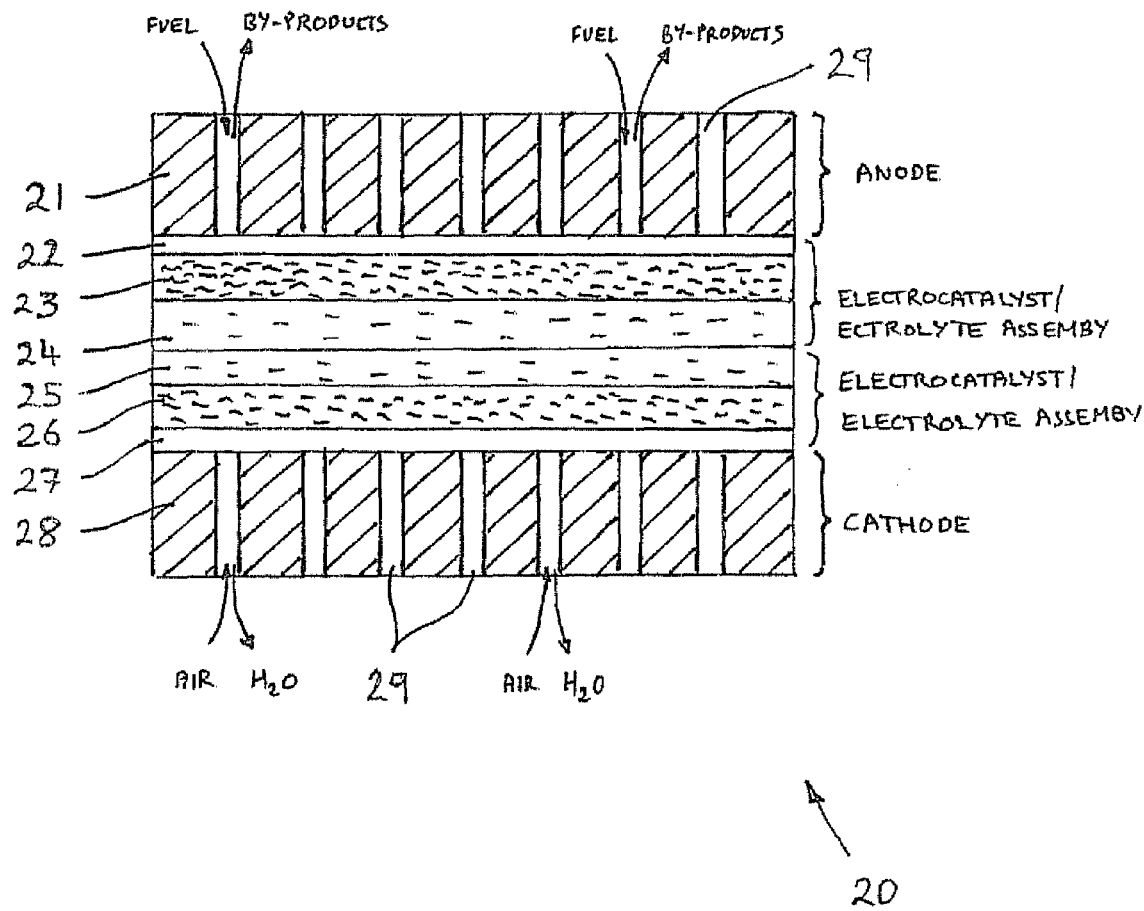
FIG. 2 is a schematic representation of a solid acid fuel cell MEA in accordance with the invention.

Referring to FIG. 2 there is shown a membrane electrode assembly 20 (MEA) for a solid acid fuel cell in accordance with the invention. The MEA 20 comprises: an anode electrode 21; a first electrocatalyst/electrolyte assembly 22-24, a second electrocatalyst/electrolyte assembly 25-27 and a cathode electrode 28. The first electrocatalyst/electrolyte assembly comprises carbon fiber paper 22 having a carbon nano-tube/electrocatalyst layer 23 formed thereon and a thin film layer of solid acid electrolyte layer 24. Likewise, the second electrocatalyst/electrolyte assembly comprises a carbon fiber paper 27 having a carbon nano-tube/electrocatalyst layer 26 formed on its surface and a thin film of solid acid electrolyte 25 deposited on the electrocatalyst/carbon nano-tube.

In this embodiment the anode 21 and cathode 28 are made of stainless steel and have a series of passages, holes, 29 passing through their entire thickness to enable fuel (e.g. hydrogen $H_2$, methanol $CH_3OH_4$, ethanol $C_2H_5OH$ etc) and an oxidant (e.g. air/oxygen $O_2$) to flow into the fuel cell through the anode 21 and cathode 28 respectively and to allow fuel cell by-products (e.g. water $H_2O$ in the form of steam, $CO_2$) to escape from the cell. The solid acid electrolyte layers 24 and 25 comprise a solid acid such as for example cesium dihydrogen phosphate (CDP).

The construction of the electrocatalyst/electrolyte assemblies will now be described. The carbon fiber paper 22, 27 functions as a substrate on which nano-structured carbon is grown. The carbon electrocatalyst/electrolyte assembly is fabricated as follows:

(1) A thin film of transition metal catalyst material (e.g. Nickel Ni, Cobalt Co, Iron Fe, Titanium Ti, Vanadium V, Molybdenum Mo, Tungsten W) is deposited on a sheet of carbon paper using magnetron sputtering;

(2) The paper/catalyst is then processed using chemical vapor deposition (CVD) in which the catalyst material is heated to high temperatures (e.g. 600-900° C.) in a tube furnace and a hydrocarbon gas is passed over the catalyst. The effect of the CVD process is to dissociate hydrocarbon molecules catalyzed by the transition metal and the dissolution and saturation of carbon atoms in the metal to promote tip and root growth of a carbon nanotube structure on the surface of paper. During this process the majority of the catalyst is consumed though there may be some residual catalyst remaining. Both multi-walled nano-tubes (MWNTs) and single-walled nano-tubes (SWNTs) can be grown by the CVD method. In the context of this patent application a nano-structured material is defined as a structure whose dimensions are in a nanometer range typically in a range 5 to 100 nm. For example nano-tubes can typically have an outside diameter of 5 to 100 nm.

(3) The electrocatalyst (e.g. a catalytically active metal typically Platinum Pt, Ruthenium Ru, Palladium Pd, Rhodium Rh or alloys thereof) is deposited on the nanotube layer using magnetron sputtering to form a substantially continuous thin film over the surface of the nano-tubes. Alternatively the electrocatalyst can be deposited using chemical vapor deposition (CVD), molecular beam epitaxy (MBE), plasma-assisted vapor deposition and like methods. In typical embodiments the thin film ranges in thickness from 1 nm to 500 nm. The carbon nano-tubes function as a support for the electrocatalyst.

(4) Finally the solid acid electrolyte is deposited as a thin film, typically 2-25 μm in thickness, on the carbon nano-tube/catalyst using for example vacuum techniques such as ion beam sputtering, magnetron sputtering, molecular beam epitaxy, laser ablation or like, nano-synthesis techniques such as laser pyrolysis or deposition techniques such as dipping, spraying or otherwise applying a slurry of electrolyte nano-particles and liquid binder and then baking the binder out. Regardless of the technique used to deposit the electrolyte an object is to deposit nano sized particles to ensure maximum penetration of the electrolyte into the nano-structured material and to thereby maximize the surface contact between the electrolyte and electrocatalyst.

The fuel cell is constructed by physical stacking of the electrodes 21, 28 and electrocatalyst/electrolyte assemblies and encasing the MEA. Suitable electrocatalyst can include catalytically active metals such as platinum (PT) or binary alloys thereof such as Pt—Cr, Pt—V, Pt—Ta, Pt—Cu, Pt—Ru, Pt—Y etc. and/or ternary alloys including Pt—Ru—Os, Pt—Ni—Co, Pt—Cr—C, Pt—Cr—Ce, Pt—Co—Cr, Pt—Fe, —Co, Pt—Ru—Ni, Pt—Co—Cr etc. and/or quaternary alloys including Pt—Ga—Cr—Co, Pt—Ga—Cr—Ni, Pt—Ni—Co—Mn, Pt—Fe—Co—Cu.

An advantage of the fuel cell of the invention is the use of a carbon nanotube as an electrocatalyst support increases surface area of the electrocatalyst. Moreover, the carbon nano-tubes also act as a gas diffusion layer thereby eliminating the need for a separate gas diffusion layer. Additionally, depositing the electrolyte as nano sized particles onto the electrocatalyst helps maximize the area of surface contact between the electrolyte and electrocatalyst and increase the power density of the fuel cell.

Electrolyte/Electrode Assembly

Figure 3:
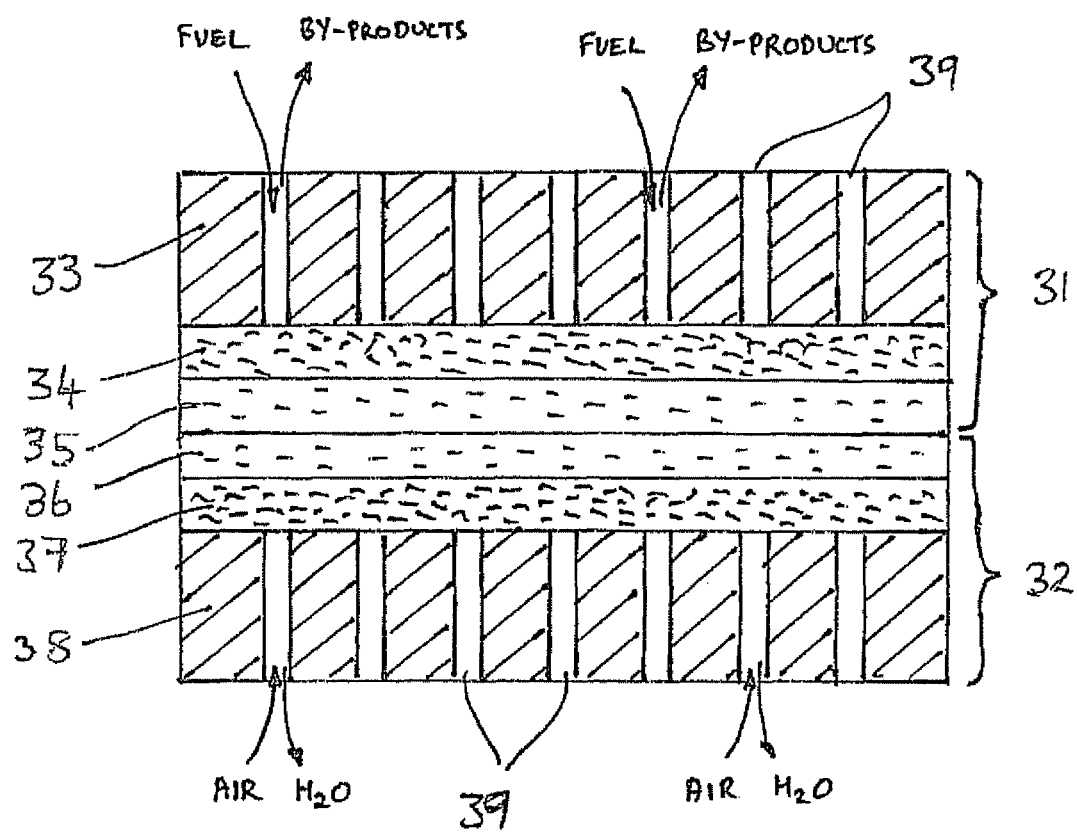
FIG. 3 is a schematic representation of a solid acid fuel cell MEA in accordance with a further embodiment of the invention.

Referring to FIG. 3 there is shown an MEA 30 for a solid acid fuel cell in accordance with the invention. The fuel cell comprises: anode and cathode electrolyte/electrode assemblies 31, 32 respectively. The anode electrolyte/electrode assembly 31 comprises an anode electrode 33; a carbon nanotube/electrocatalyst layer 34 and a solid acid electrolyte layer 35. Likewise, the cathode electrolyte/electrode assembly 32 comprises a cathode electrode 38, a carbon nano-tube/electrocatalyst layer 37 and an electrolyte layer 36. In this embodiment the anode 33 and cathode 38 are made of stainless steel and have a series of holes, passages, 39 passing through their entire thickness to enable fuel (e.g. hydrogen $H_2$, methanol $CH_3OH_4$, ethanol $C_2H_5OH$) and an oxidant (e.g. oxygen $O_2$) to flow into the fuel cell through the anode 33 and cathode 38 respectively and to allow fuel cell by-products (e.g. water $H_2O$ in the form of steam, $CO_2$) to escape from the cell. The solid acid electrolyte layers 35, 36 comprise a solid acid deposited on their respective carbon nano-tube/electrocatalyst layer 34, 37.

In this embodiment the carbon nano-tubes function as both a gas diffusion layer and as a support for the electrocatalyst. The electrolyte/electrode assemblies are fabricated as follows:

(1) A thin film of transition metal catalyst material (e.g. Ni, Co, Fe, Ti, V, Mo, W) is deposited on the porous stainless steel electrode using magnetron sputtering.

(2) The electrode/catalyst is then processed using chemical vapor deposition (CVD) in which the catalyst material is heated to high temperatures (e.g. 600-900° C.) in a tube furnace and a hydrocarbon gas is passed over the catalyst. The effect of the CVD process is to dissociate hydrocarbon molecules catalyzed by the transition metal and the dissolution and saturation of carbon atoms in the metal to promote tip and root growth of a carbon nanotube structure on the surface of paper. During this process the majority of the catalyst is consumed though there may be some residual catalyst remaining. Both multi-walled (MWNT) and single-walled (SWNT) can be grown by the CVD method.

(3) The electrocatalyst is deposited on the nanotube layer using magnetron sputtering.

(4) Finally the solid acid electrolyte is deposited as a thin film on the carbon nano-tube/catalyst using for example ion beam sputtering, magnetron sputtering, molecular beam epitaxy, laser ablation or like, nano-synthesis techniques such as laser pyrolysis or deposition techniques such as dipping, spraying, printing, screen printing or otherwise applying a slurry of electrolyte nano-particles and liquid binder and then baking the binder out.

The cell is constructed by placing the two electrolyte/electrode assemblies with the solid electrolyte layer faces in contact with one another.

An advantage of the fuel cell of the invention is the use of a carbon nanotube as an electrocatalyst support increases surface area of the electrocatalyst. Secondly, since the carbon nanotube additionally acts as a gas diffusion layer this eliminates the need for a separate ceramic diffusion layer and thereby reduces the number of manufacturing steps and cost. Additionally since the solid electrolyte is further deposited on the electrocatalyst results in a fuel cell having only two components, the electrolyte/electrode assemblies further reducing the cost.

It will be appreciated that the present invention is not restricted to the specific embodiments described. For example whilst the electrodes are described as fabricated from stainless steel other electrode material will be readily apparent to those skilled in the art and can include electrically conducting materials or composites capable of operating at elevated temperatures without degradation. Moreover, the electrode material is advantageously capable of having the nano-structured material grown directly on its surface. In one arrangement the electrode comprises porous stainless steel onto which the nano-structured material is grown. In the context of this patent application porous means gas permeable that is permeable to the fuel ($H_2$), oxidant ($O_2$) and by products. When using a porous electrode material and depending on the surface area of the electrodes the electrode holes/passages 29, 39 can be dispensed with. Other porous electrode material will be readily apparent to those skilled in the art.

Moreover, whilst carbon nano-tubes are a preferred electrocatalyst support material it is contemplated to use other support material having a nano-structure such as for example rods, fibers or filaments. Additionally the nano-structured material can comprise other material such as silicon, titanium, boron, graphite etc.

In addition to carbon paper as substrate onto which the nano-structured material is grown or deposited the inventors also envisage the use of other substrates such as for example carbon cloth, graphite paper or cloths or other porous materials including porous metals, ceramic materials and composite materials comprising a polymer loaded with carbon fibres. In the context of this patent a cloth refers to a material of woven construction.

What is claimed is:

1. A membrane electrode assembly for a solid electrolyte fuel cell comprising:
   an electrode having a layer of nano-structured material formed on the electrode, said nano-structured material having a surface area greater than a surface area of the electrode,
   a layer of an electrocatalyst deposited on the surface area of the nano-structured material and
   a layer of solid acid electrolyte nano-particles deposited on a surface area of the electrocatalyst-coated nano-structured material.

2. The assembly of claim 1, wherein the nano-structured material is selected from the group consisting of: carbon, silicon, boron and titanium.

3. The assembly of claim 1, wherein the nano-structured material is selected from the group consisting of: multi-walled nano-tubes (MWNTs), single-walled nano-tubes (SWNTs), nano-fibers, nano-rods and combinations thereof.

4. The assembly of claim 1, wherein the nano-structured material is selected from the group consisting of: nano-structured material grown in situ on the electrode surface, and nano-structured material deposited on the electrode surface.

5. The assembly of claim 4, wherein the nano-structured material is grown using chemical vapor deposition.

6. The assembly of claim 1, wherein the electrocatalyst is deposited on the nano-structured material using a method selected from the group consisting of: physical vapor deposition (PVD), ion beam sputtering, molecular beam epitaxy (MBE), evaporation, and laser ablation.

7. The assembly of claim 1, wherein the electrocatalyst is selected from the group consisting of: a noble metal, an alloy of a noble metal, and d-block element.

8. The assembly of claim 1, wherein the electrode comprises an electrically conducting porous material.

9. The assembly of claim 8, wherein the electrode comprises porous stainless steel.

10. The assembly of claim 1, wherein the electrode has at least one passage passing through its thickness to allow the passage of gases through the electrode.

11. The assembly of claim 1, wherein the electrolyte is deposited on the nano-structured material/electrocatalyst using a method selected from the group consisting of: physical vapor deposition (PVD), ion beam sputtering, molecular beam epitaxy (MBE), evaporation, laser ablation, magnetron sputtering, dipping, and spraying.

12. A solid electrolyte fuel cell comprising:
a first electrocatalyst/electrolyte assembly including an anode,
a first nano-structured material formed on the anode, said first nano-structured material having a surface area greater that a surface area of the anode,
a first layer of an electrocatalyst supported by the surface area of the first nano-structured material,
a first layer of a solid acid electrolyte formed on a surface area of the first electrocatalyst layer supported by the first nano-structured material; and
a second electrocatalyst/electrolyte assembly including a cathode,
a second nano-structured material formed on the cathode said second nano-structured material having a surface area greater that a surface area of the cathode,
a second layer of an electrocatalyst supported by the surface area of the second nanostructured material,
a second layer of a solid acid electrolyte formed on a surface area of the second electrocatalyst layer separately from the first layer of the solid acid electrolyte and supported by the second nano-structured material; and
wherein the first electrocatalyst/electrolyte assembly and the second electrocatalyst/electrolyte assembly are stacked so that the first solid acid electrolyte layer contacts the second solid acid electrolyte layer.

13. The solid electrolyte fuel cell of claim 12, wherein the nano-structured material of the first portion and the second portion is selected from the group consisting of carbon, silicon, boron and titanium, multi-walled nano-tubes (MWNTs), single-walled nano-tubes (SWNTs), nano-fibers, nano-rods and combinations thereof.

14. The solid electrolyte fuel cell of claim 12, wherein one or both of the nanostructured materials is formed on a substrate supported by the corresponding one of the anode and the cathode; and wherein the substrate is selected from the group consisting of: carbon fiber paper, carbon cloth, graphite paper, graphite cloth and a porous metal.

15. The solid electrolyte fuel cell of claim 12, wherein one or both of the anode and the cathode comprises an electrically conducting porous material.

16. The solid electrolyte fuel cell of claim 12, wherein one or both of the anode and the cathode comprises porous stainless steel.

17. The solid electrolyte fuel cell of claim 12, wherein the anode and the cathode each have at least one passage passing through its thickness to allow the passage of gases through the electrode.

18. A method of forming a solid acid fuel cell, comprising:
forming a first electrocatalyst/electrolyte assembly over an anode by performing the steps of:
forming a layer of nano-structured material on a first substrate of one or more substrates, wherein the first substrate is the anode or supported by the anode,
forming an electrocatalyst over the layer of nano-structure material to form a combined layer of electrocatalyst and nano-structure material, and
forming an electrolyte layer over the combined layer; and
forming a second electrocatalyst/electrolyte assembly over a cathode by performing the steps of:
forming a layer of nano-structured material on a second substrate of the one or more substrates, wherein the second substrate is the cathode or supported by the cathode,
forming an electrocatalyst over the layer of nano-structure material to form a combined layer of electrocatalyst and nano-structure material, and
forming an electrolyte layer over the combined layer; and
abutting the electrolyte layer of the first electrocatalyst/electrolyte assembly with the electrolyte layer of the second electrocatalyst/electrolyte assembly to form the solid acid fuel cell.

19. The method of claim 18, wherein the step of forming a layer of nano-structured material on a substrate includes growing the nano-structured material on the substrate in situ and depositing the nano-structured material on the substrate.

20. The support of claim 19, wherein depositing the nano-structured material on the substrate includes forming a layer of nano-structured material on the substrate using chemical vapor deposition (CVD).

21. The support of claim 18, wherein the electrocatalyst is formed by depositing the electrocatalyst on the nano-structured material using a technique selected from the group consisting of: physical vapor deposition (PVD), ion beam sputtering, molecular beam epitaxy (MBE), evaporation, and laser ablation.

22. The assembly of claim 18, wherein the electrolyte layer is formed by depositing the electrolyte on the combined layer using a technique selected from the group consisting of: physical vapor deposition (PVD), ion beam sputtering, molecular beam epitaxy (MBE), evaporation, laser ablation, magnetron sputtering, dipping, and spraying.

23. The solid electrolyte fuel cell of claim 12, wherein the electrocatalyst of the first electrocatalyst/electrolyte assembly and the electrocatalyst of the second electrocatalyst/electrolyte assembly are selected from the group consisting of a noble metal, an alloy of a noble metal, and d-block element.

* * * * *